United States Patent
Ohara et al.

(10) Patent No.: US 12,173,173 B2
(45) Date of Patent: Dec. 24, 2024

(54) PHOTOCURABLE INKJET INK AND METHOD FOR MANUFACTURING THREE-DIMENSIONAL OBJECT

(71) Applicant: MIMAKI ENGINEERING CO., LTD., Nagano (JP)

(72) Inventors: Kazuki Ohara, Nagano (JP); Sayuri Goto, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 165 days.

(21) Appl. No.: 17/626,484

(22) PCT Filed: Jun. 30, 2020

(86) PCT No.: PCT/JP2020/025692
§ 371 (c)(1),
(2) Date: Jan. 11, 2022

(87) PCT Pub. No.: WO2021/020006
PCT Pub. Date: Feb. 4, 2021

(65) Prior Publication Data
US 2022/0282111 A1     Sep. 8, 2022

(30) Foreign Application Priority Data

Jul. 26, 2019 (JP) .................. 2019-137932
Jul. 26, 2019 (JP) .................. 2019-138162

(51) Int. Cl.
   *C09D 133/08*     (2006.01)
   *B29C 64/112*     (2017.01)
(Continued)

(52) U.S. Cl.
CPC .......... *C09D 133/08* (2013.01); *B29C 64/112* (2017.08); *B29C 64/209* (2017.08);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2009/0025638 A1*   1/2009   Inoue .................. A61C 13/0013
                                                           118/712
2017/0058138 A1*   3/2017   Kida .................... C09D 11/322
(Continued)

FOREIGN PATENT DOCUMENTS

CN       102585596       7/2012
CN       102585599       7/2012
(Continued)

OTHER PUBLICATIONS

"International Search Report (Form PCT/ISA/210) of PCT/JP2020/025692," mailed on Sep. 24, 2020, with English translation thereof, pp. 1-6.
(Continued)

*Primary Examiner* — Manish S Shah
(74) *Attorney, Agent, or Firm* — JCIPRNET

(57) ABSTRACT

The photocurable inkjet ink contains: a radical polymerizable compound; a photoinitiator; and a thixotropic agent, and has a first viscosity of 1,000 mPa·s or less as measured at a shear rate of 10,000 s$^{-1}$, and a second viscosity of 10,000 mPa·s or more as measured at a shear rate set to 10$^{-1}$ s$^{-1}$ after a shear force is continuously applied at the shear rate of 10,000 s$^{-1}$ for 30 seconds.

9 Claims, 3 Drawing Sheets

(51) Int. Cl.
    | | |
    |---|---|
    | *B29C 64/209* | (2017.01) |
    | *B29C 64/264* | (2017.01) |
    | *B29K 105/00* | (2006.01) |
    | *B29K 509/02* | (2006.01) |
    | *B33Y 10/00* | (2015.01) |
    | *B33Y 70/00* | (2020.01) |
    | *B41J 2/21* | (2006.01) |
    | *C09D 11/38* | (2014.01) |

(52) U.S. Cl.
    CPC ............ *B29C 64/264* (2017.08); *B33Y 10/00* (2014.12); *B33Y 70/00* (2014.12); *B41J 2/21* (2013.01); *B41J 2/2107* (2013.01); *C09D 11/38* (2013.01); *B29K 2105/0002* (2013.01); *B29K 2105/0094* (2013.01); *B29K 2509/02* (2013.01); *B29K 2995/0092* (2013.01)

(58) Field of Classification Search
    CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 7/61; C09D 7/62; C09D 7/68; C09D 7/70; C09D 11/00; C09D 11/037; C09D 11/326; B41M 5/0011; B41M 5/0017; B41M 5/0023; B41M 5/0047; B41M 7/00; B41M 7/0072; B41M 5/52; B41M 5/5218; B41M 5/5227; C09K 11/02; C09K 11/883; H01L 33/06; H01L 2933/0091; C08K 3/22; C08K 7/18; C08K 9/00; Y10T 29/49401
    See application file for complete search history.

(56) References Cited

U.S. PATENT DOCUMENTS

| | | | |
|---|---|---|---|
| 2017/0218213 A1* | 8/2017 | Torfs | B29C 59/022 |
| 2017/0283641 A1* | 10/2017 | Miyajima | C09D 11/107 |
| 2018/0079919 A1* | 3/2018 | Steert | B41M 5/502 |
| 2020/0269591 A1* | 8/2020 | Hamamoto | B41J 29/13 |
| 2020/0392358 A1* | 12/2020 | Courtet | B41M 5/0047 |

FOREIGN PATENT DOCUMENTS

| | | |
|---|---|---|
| JP | H0577324 | 3/1993 |
| JP | 2007204534 | 8/2007 |
| JP | 2012025124 | 2/2012 |
| JP | 2016147241 | 8/2016 |
| JP | 2016147456 | 8/2016 |
| JP | 2017088820 | 5/2017 |
| JP | 2017518898 | 7/2017 |
| JP | 2018039213 | 3/2018 |
| JP | 2019119748 | 7/2019 |

OTHER PUBLICATIONS

"Office Action of China Counterpart Application", issued on Jul. 21, 2022, with English translation thereof, pp. 1-19.

* cited by examiner

US 12,173,173 B2

PHOTOCURABLE INKJET INK AND METHOD FOR MANUFACTURING THREE-DIMENSIONAL OBJECT

CROSS-REFERENCE TO RELATED APPLICATION

This application is a 371 application of the International PCT application serial no. PCT/JP2020/025692, filed on Jun. 30, 2020, which claims the priority benefits of Japan Patent Application No. 2019-137932, filed on Jul. 26, 2019, and Japan Patent Application No. 2019-138162, filed on Jul. 26, 2019. The entirety of each of the above-mentioned patent applications is hereby incorporated by reference herein and made a part of this specification.

TECHNICAL FIELD

The present invention relates to a photocurable inkjet ink and a method for manufacturing a three-dimensional object.

BACKGROUND ART

An apparatus such as an inkjet printer or a dispenser ejects ink and causes the ink to fly to and land at a printing position. Since the photocurable inkjet ink used in these apparatuses flies to an appropriate position, the viscosity at the time of ejection and the viscosity at the time of landing must not be greatly different.

For example, Patent Literature 1 proposes improving ejection stability of a photocurable inkjet ink. Patent Literature 1 discloses an ultraviolet-curable composition which is ejected by an inkjet method, and the ultraviolet-curable composition contains a polymerizable compound, a metallic powder, and a thixotropy inhibitor, and satisfies a relationship of $\eta2-\eta1 \leq 3$ between a viscosity $\eta1$ [mPa·s] at a shear rate of 1,000 s$^{-1}$ and a viscosity $\eta2$ [mPa·s] determined by measurement at a shear rate set to 10 s$^{-1}$ after a shear stress is continuously applied at the shear rate of 1,000 s$^{-1}$ for 10 minutes.

CITATION LIST

Patent Literature

Patent Literature 1: Japanese Unexamined Patent Publication No. 2017-88820
Patent Literature 2: Japanese Unexamined Patent Publication No. 2016-147241
Patent Literature 3: Japanese Unexamined Patent Publication No. 2016-147456
Patent Literature 4: Japanese Unexamined Patent Publication No. 2018-039213

SUMMARY OF INVENTION

Technical Problems

When the photocurable inkjet ink is used for inkjet printing and additive manufacturing such as a method for manufacturing a three-dimensional object by layering ink with a dispenser, the ink landed at the printing position preferably has a high viscosity and does not wet-spread. By increasing the viscosity, for example, smearing of the ink can be suppressed to improve quality of printing and shaping, and, for example, a thickness of the ink to be layered at one time can be increased to increase a layering speed to improve a speed of shaping.

However, conventionally, as shown in Patent Literature 1 and the like, the viscosity of the ink at the time of ejection and the viscosity of the ink at the time of landing cannot be greatly different. In order to increase the viscosity of the ink at the time of landing, it is necessary to increase the viscosity at the time of ejection as well, but ink having a high viscosity at the time of ejection is likely to clog in an ejection device or at an ejection port.

That is, the ejectability and the printability or shapeability (for example, printing quality, shaping quality, or shaping speed) of the ink were in a trade-off relationship.

Furthermore, in manufacture of a three-dimensional object, the manufacture of the three-dimensional object becomes easy if a large amount of photocurable inkjet ink having a high viscosity is ejected using a dispenser as disclosed in Patent Literatures 2 to 4, to thicken an ink layer. However, when trying to thicken the ink layer using a conventional dispenser ink, there is a problem that an inside of the ink layer is difficult to be cured.

In view of the above, the present invention provides a photocurable inkjet ink that can be suitably printed or shaped.

Solutions to Problems

A photocurable inkjet ink according to a first aspect of the present invention contains: a radical polymerizable compound; a photoinitiator; and a thixotropic agent, and has a first viscosity of 1,000 mPa·s or less as measured at a shear rate of 10,000 s$^{-1}$, and a second viscosity of 10,000 mPa·s or more as measured at a shear rate set to 10$^{-1}$ s$^{-1}$ after a shear force is continuously applied at the shear rate of 10,000 s$^{-1}$ for 30 seconds.

According to the above configuration, since the viscosity of the ink can be made low at the time of ejection and high at the time of landing, both the ejectability and the printability or shapeability of the ink can be achieved.

The radical polymerizable compound may be an acrylate monomer.

According to the above configuration, since the viscosity of the ink can be made low at the time of ejection and high at the time of landing, both the ejectability and the printability or shapeability of the ink can be achieved.

The thixotropic agent may be fine particles of silicon dioxide.

According to the above configuration, since the viscosity of the ink can be made low at the time of ejection and high at the time of landing, both the ejectability and the printability or shapeability of the ink can be achieved.

A solubility parameter of the radical polymerizable compound may be less than 10, and the thixotropic agent may be fine particles having a hydrophilic surface.

According to the above configuration, since the viscosity of the ink can be made low at the time of ejection and high at the time of landing, both the ejectability and the printability or shapeability of the ink can be achieved.

The fine particles having a hydrophilic surface may be fine particles of silicon dioxide having an untreated surface.

According to the above configuration, since the viscosity of the ink can be made low at the time of ejection and high at the time of landing, both the ejectability and the printability or shapeability of the ink can be achieved. In addition, the fine particles of silicon dioxide having an untreated surface are inexpensive and thus excellent in economic efficiency.

A solubility parameter of the radical polymerizable compound may be 10 or more, and the thixotropic agent may be fine particles having a hydrophobic surface.

According to the above configuration, since the viscosity of the ink can be made low at the time of ejection and high at the time of landing, both the ejectability and the printability or shapeability of the ink can be achieved.

A photocurable inkjet ink according to a second aspect of the present invention contains: an aminoalkylphenone-based initiator; a phosphine oxide-based initiator; a thioxanthone-based sensitizer; and a radical polymerizable compound.

The photocurable inkjet ink having the above configuration has excellent internal curability, and thus can be suitably printed or shaped.

The photocurable inkjet ink according to the second aspect of the present invention is preferably used in a 3D dispenser that forms an ink layer by ejecting ink.

By using the photocurable inkjet ink having the above configuration in a 3D dispenser, an inside of the formed ink layer can be cured favorably.

The radical polymerizable compound is preferably an acrylate.

The photocurable inkjet ink having the above configuration is preferable, from the viewpoint of durability of a three-dimensional object manufactured using the photocurable inkjet ink.

The acrylate is preferably a bifunctional acrylate.

The photocurable inkjet ink having the above configuration is preferable, from the viewpoint of rigidity of a three-dimensional object manufactured using the photocurable inkjet ink.

A method for manufacturing a three-dimensional object using the photocurable inkjet ink according to the second aspect of the present invention includes:

an ink ejecting step of forming an ink layer by ejecting the photocurable inkjet ink with a dispenser; and a curing step of irradiating the ink layer with light having any wavelength ranging from 405 nm to 420 nm to cure the ink layer to form a cured layer.

(In the present specification, the description "a to b" means "a or more and b or less".)

In the method for manufacturing a three-dimensional object having the above configuration, the ink used is excellent in internal curability, and thus the inside of the ink layer is cured favorably.

A film thickness of the ink layer in the ink ejecting step is preferably 0.1 mm to 2 mm.

In the method for manufacturing a three-dimensional object having the above configuration, the formed layer has a large thickness, and the inside of the layer is cured favorably.

In the curing step, it is preferable that light having a wavelength of 365 nm or 385 nm be further emitted.

The method for manufacturing a three-dimensional object having the above configuration is preferable, from the viewpoint of surface curing.

Effect of the Invention

According to the present invention, printing or shaping can be suitably performed.

DESCRIPTION OF EMBODIMENTS

First Embodiment

Hereinafter, in the description of a first embodiment, the photocurable inkjet ink is also simply referred to as "photocurable ink" or "ink".

The photocurable inkjet ink according to the first embodiment of the present invention contains a radical polymerizable compound, a photoinitiator, and a thixotropic agent. As will be described later, thixotropy of the present ink is controlled by the thixotropic agent so that the present ink is easily ejected from an ejection port such as a nozzle, and that wet-spreading of the present ink after landing is suppressed.

(Ejection Device)

The present ink is used by any ejection device capable of ejecting the present ink, particularly, an ejection device that ejects the present ink in order to print the present ink on a printing target object (for example, a print medium such as paper, a raw material roll such as fabric, a building material such as a glass plate or a wooden plate, and the like) or to form a three-dimensional object by layering the present ink.

Any ejection device may be employed as long as it can eject the present ink and cause the present ink to fly from the ejection port and land at a specific position. For example, the ejection device may be an inkjet printer including an ejection mechanism (for example, a print head) of an inkjet method (for example, continuous type or on-demand type (piezoelectric method or thermal method)), or may be a dispenser including an ejection mechanism (for example, a syringe) of another fixed-amount liquid ejection method (for example, lead screw method or pneumatic method).

The ejection device preferably includes a mechanism that applies a shear force to the present ink by vibration, stirring, compression, or the like so that the present ink does not clog from a storage portion (for example, a tank, a cartridge, or the like) that stores the present ink to the ejection port (in particular, at the ejection port). As such a mechanism that applies a shear force, for example, those described in Japanese Unexamined Patent Publications Nos. 2005-212412, 2008-149594, 8-216425, and the like can be employed.

Figure 1:
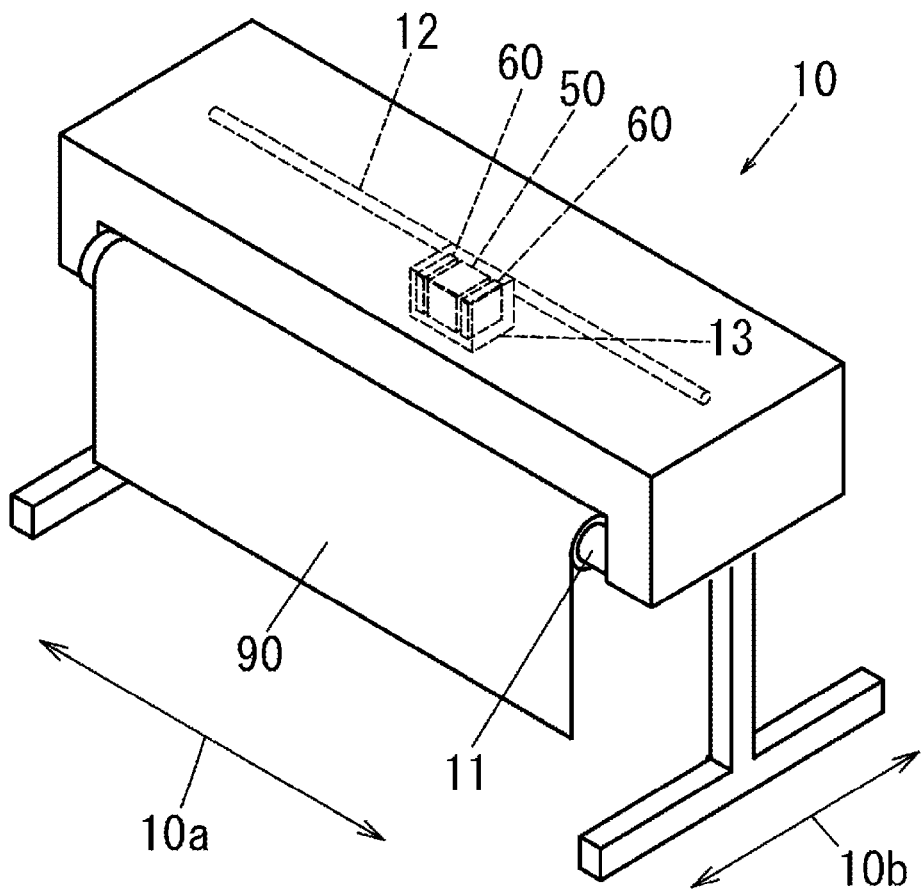
FIG. 1 is a schematic diagram illustrating an inkjet printer that is an example of an ejection device.

FIG. 1 is a schematic diagram illustrating an inkjet printer 10 which is an example of the ejection device.

As illustrated in FIG. 1, the inkjet printer 10 includes a conveying apparatus 11 that conveys a medium 90 such as paper, a seal or a label, a carriage 13 on which a print head 50 and a light irradiation device 60 are mounted, and a guide rail 12 that supports the carriage 13.

The conveying apparatus conveys the medium 90 in a sub scanning direction (arrow 10b) orthogonal to a main scanning direction (arrow 10a).

The guide rail 12 extends in the main scanning direction, and the carriage 13 is driven by a driving device (not illustrated) to move in the main scanning direction along the guide rail 12. The print head 50 mounted on the carriage 13 ejects the photocurable ink supplied from an ink tank (not illustrated) onto the medium 90. The light irradiation device 60 irradiates the photocurable ink ejected from the print head 50 onto the medium 90 with light such as ultraviolet light to cure the ink.

When performing printing with the inkjet printer 10, the ink is ejected from the print head 50 toward the medium 90 while moving the carriage 13 from one side to the other side in the main scanning direction. The light irradiation device 60 irradiates the ink ejected onto the medium 90 with light to cure the ink.

When the movement of the carriage 13 from one side to the other side is completed, the conveying apparatus 11 is driven to move the medium 90 in the sub scanning direction, and then the ink is ejected and cured again while moving the carriage 13 from the other side to the one side. Each time one movement of the carriage 13 from one side to the other side or from the other side to one side is completed, the medium 90 is moved in the sub scanning direction in this manner, whereby printing onto the medium 90 can be performed.

The ink ejected from the inkjet printer 10 and landed on the medium 90 preferably has a high viscosity and does not wet-spread. When the viscosity at the time of eject is high, ink clogging at the ejection port of the print head 50 is likely to occur. Therefore, by performing printing using the photocurable inkjet ink according to the first embodiment, the ink can be easily ejected from the ejection port, and wet-spreading of the ink after landing can be suppressed, as will be described later.

(Radical Polymerizable Compound)

The radical polymerizable compound is not particularly limited as long as it is a compound having radical polymerizability, but an acrylate is preferable in terms of polymerizability, durability of a cured product, solubility of the initiator/sensitizer, and the like. In particular, the radical polymerizable compound is preferably an acrylate monomer.

Examples of the acrylate include monofunctional acrylates such as phenol EO-modified acrylate, nonylphenol EO-modified acrylate, and ethoxydiethylene glycol acrylate; difunctional acrylates such as hexanediol diacrylate, hexanediol EO-modified diacrylate, hydroxypivalic acid neopentyl glycol diacrylate, neopentyl glycol PO-modified diacrylate, tripropylene glycol diacrylate, dipropylene glycol diacrylate, bisphenol AEO-modified diacrylate, polyethylene glycol diacrylate, and polypropylene glycol diacrylate; and polyfunctional acrylates such as trimethylolpropane triacrylate, trimethylolpropane EO-modified triacrylate, trimethylolpropane PO-modified triacrylate, glycerin propoxy triacrylate, pentaerythritol triacrylate, pentaerythritol EO-modified tetraacrylate, ditrimethylolpropane tetraacrylate, and dipentaerythritol hexaacrylate.

These radical polymerizable compounds can be used singly, or two or more thereof may be used in combination.

Among them, a bifunctional acrylate is preferable, and a combination of PO-modified neopentyl glycol PO-modified diacrylate and bisphenol AEO-modified diacrylate is more preferable, from the viewpoint of mechanical properties such as durability and rigidity of the resulting shaped object.

Examples of the monofunctional acrylate that can be used include phenol EO-modified (n=2) acrylate (trade name: Miramer M142), phenol EO-modified (n=4) acrylate (trade name: Miramer M144), nonylphenol EO-modified (n=8) acrylate (trade name: Miramer M166), and ethoxydiethylene glycol acrylate (trade name: Miramer M170), manufactured by Miwon Specialty Chemical Co., Ltd.

Examples of the bifunctional acrylate that can be used include hexanediol diacrylate (trade name: Miramer M200), hexanediol EO-modified diacrylate (trade name: Miramer M202), hydroxypivalic acid neopentyl glycol diacrylate (trade name: Miramer M210), neopentyl glycol PO-modified (n=2) diacrylate (trade name: Miramer M216), tripropylene glycol diacrylate (trade name: Miramer M220), dipropylene glycol diacrylate (trade name: Miramer M222), bisphenol AEO-modified (n=4) diacrylate (trade name: Miramer M240), bisphenol AEO-modified (n=10) diacrylate (trade name: Miramer M2100), polyethylene glycol (molecular weight: 400) diacrylate (abbreviated name: PEG400DA, trade name: Miramer M280), polyethylene glycol (molecular weight: 300) diacrylate (abbreviated name: PEG300DA, trade name: Miramer M284), and polypropylene glycol diacrylate (trade name: Miramer M2040), manufactured by Miwon Specialty Chemical Co., Ltd.

Examples of the polyfunctional acrylate that can be used include trimethylolpropane triacrylate (trade name: Miramer M300), trimethylolpropane EO-modified (n=3) triacrylate (trade name: Miramer M3130), trimethylolpropane EO-modified (n=6) triacrylate (trade name: Miramer M3160), trimethylolpropane EO-modified (n=9) triacrylate (trade name: Miramer M3190), trimethylolpropane PO-modified (n=3) triacrylate (trade name: Miramer M360), glycerin propoxy triacrylate (trade name: Miramer M320), pentaerythritol triacrylate (trade name: Miramer M340), and pentaerythritol EO-modified tetraacrylate (trade name: Miramer M4004), dimethylolpropane tetraacrylate (trade name: Miramer M410), and dipentaerythritol hexaacrylate (trade name: Miramer M600), manufactured by Miwon Specialty Chemical Co., Ltd.

A content of the radical polymerizable compound in the present ink is not particularly limited, but is preferably 70 to 99 mass %, more preferably 75 to 90 mass %, and particularly preferably 80 to 85 mass %.

(Photoinitiator/Sensitizer)

The photoinitiator is not particularly limited as long as it generates a radical by being irradiated with light having a specific wavelength (for example, ultraviolet light) and cures the radical polymerizable compound.

Examples of the initiator include aminoalkylphenone-based initiators and phosphine oxide-based initiators. The initiators may be used singly, or two or more thereof may be used in combination.

Among the aminoalkylphenone-based initiators, an α-aminoalkylphenone-based initiator is preferable, and 2-benzyl-2-(dimethylamino)-4'-morpholinobutyrophenone is more preferable.

Examples of the aminoalkylphenone-based initiator that can be used include 2-methyl-1-[4-(methylthio)phenyl]-2-morpholinopropan-1-one (trade name: Omnirad 907 (former trade name of BASF: Irgacure 907)), 2-benzyl-2-(dimethylamino)-4'-morpholinobutyrophenone (trade name: Omnirad 369 (former trade name of BASF: Irgacure 369)), and 2-dimethylamino-2-(4-methyl-benzyl)-1-(4-morpholin-4-yl-phenyl)-butan-1-one (trade name: Omnirad 379EG (former trade name of BASF: Irgacure 379EG)), manufactured by IGM Resins B.V.

The phosphine oxide-based initiator is preferably an acylphosphine oxide-based photopolymerization initiator, and 2,4,6-trimethylbenzoyl-diphenylphosphineoxide and bis(2,4,6-trimethylbenzoyl)phenylphosphineoxide are more preferable.

As the phosphine oxide-based initiator, for example, 2,4,6-trimethylbenzoyl-diphenylphosphineoxide (trade name: Omnirad TPOH (former trade name of BASF: Irgacure TPO)) and bis(2,4,6-trimethylbenzoyl)phenylphosphineoxide (trade name: Omnirad 819 (former trade name of BASF: Irgacure 819)) manufactured by IGM Resins B.V. can be used.

In addition to the initiator, a sensitizer may be blended in the ink. The sensitizer imparts photosensitivity to the initiator for a wavelength region to which the initiator has no photosensitivity, or increases photosensitivity of the initiator.

Examples of the sensitizer include thioxanthone-based sensitizers, 2-isopropylthioxanthone, and 2,4-diethylthioxanthen-9-one. The sensitizers may be used singly, or two or more thereof may be used in combination.

Examples of the thioxanthone-based sensitizer include thioxanthone, 2,4-diethyl-9H-thioxanthen-9-one, and 2-isopropylthioxanthone.

As the thioxanthone-based sensitizer, for example, thioxanthone manufactured by Tokyo Chemical Industry Co., Ltd., 2,4-diethyl-9H-thioxanthen-9-one manufactured by Wako Pure Chemical Industries, Ltd., and 2-isopropylthioxanthone manufactured by Tokyo Chemical Industry Co., Ltd. can be used.

When only an aminoalkylphenone-based initiator and a thioxanthone-based sensitizer are used or only a phosphine oxide-based initiator and a thioxanthone-based sensitizer are used as the initiator/sensitizer to be blended in the ink, the amount of each initiator dissolved is limited, and thus the amount of the initiator may be insufficient, and internal curing of the ink may be insufficient. However, when the aminoalkylphenone-based initiator, the phosphine oxide-based initiator, and the thioxanthone-based sensitizer are used in combination in the ink, a total amount of the initiators dissolved in the ink can be increased, and the internal curability of the ink can be improved by incorporating the initiators that generate a sufficient amount of radicals for curing with light having a wavelength that easily transmits the ink (for example, light having a wavelength of 405 nm), in a sufficient amount for curing.

A total content of the initiator and the sensitizer in the present ink is not particularly limited, but is preferably 1 mass % to 25 mass %, preferably 5 mass % to 20 mass %, and particularly preferably 10 mass % to 15 mass %. A content rate of the curing agent within this range is preferable from the viewpoint of reactivity of the radical polymerizable compound.

(Thixotropic Agent)

The thixotropic agent is not particularly limited as long as it is a compound that imparts desired thixotropy to the present ink, but fine particles of silicon dioxide are preferable from the viewpoint of compatibility with the radical polymerizable compound (in particular, acrylate monomer).

Examples of such fine particles of silicon dioxide include fumed silica such as hydrophilic fumed silica and hydrophobic fumed silica, silica such as mesoporous silica, and alumina.

When the thixotropic agent is composed of fine particles, it is desirable that affinity of a surface thereof be appropriately selected based on a Hildebrand solubility parameter (SP value) of the radical polymerizable compound. The SP value of the radical polymerizable compound or a mixture thereof can be calculated according to a conventional method.

When the SP value of the radical polymerizable compound is less than about 10 (for example, in the case of 9.5 or less or 9 or less), the thixotropic agent is preferably fine particles having a hydrophilic surface. Examples of such fine particles include hydrophilic fumed silica. As the hydrophilic fumed silica, Aerosil A255, Aerosil A300, Aerosil A380, and the like manufactured by AEROSIL CO., LTD. can be used. As the fine particles having a hydrophilic surface, fine particles of silicon dioxide having an untreated surface can also be used.

When the SP value of the radical polymerizable compound is about 10 or more (for example, in the case of 10.5 or more or 11 or more), the thixotropic agent is preferably fine particles having a hydrophobic surface. Examples of such fine particles include hydrophobic fumed silica. As the hydrophobic fumed silica, Aerosil R972, Aerosil R974, Aerosil R104 and the like manufactured by AEROSIL CO., LTD. can be used.

When the thixotropic agent is fine particles, the thixotropic agent may have any particle size as long as the thixotropy can be imparted to the present ink and the present ink can be ejected, but $D_{50}$ is preferably 0.1 to 0.5 μm as measured according to a laser diffraction method. For example, $D_{50}$ can be measured by using a laser diffraction/scattering particle size distribution measuring apparatus LA960 (manufactured by HORIBA, Ltd.).

A content of the thixotropic agent in the ink is not particularly limited, but a content of the thixotropic agent composed of fine particles having a hydrophilic surface is preferably 2 to 12 mass %, and particularly 4 to 8 mass %, and a content of the thixotropic agent composed of fine particles having a hydrophobic surface is preferably 4 to 16 mass %, particularly 6 to 12 mass %.

(Thixotropy)

Thixotropy of the present ink is controlled by the thixotropic agent described above so that the present ink is easily ejected from the ejection port such as a nozzle, and that wet-spreading of the present ink after landing is suppressed.

In particular, the thixotropy of the present ink is preferably adjusted so that a second viscosity is higher than a first viscosity, where a viscosity of the present ink as measured at a shear rate of 10,000 $s^{-1}$ is defined as the first viscosity, and a viscosity of the present ink, as measured at a shear rate set to $10^{-1}$ $s^{-1}$ after a shear force is continuously applied at the shear rate of 10,000 $s^{-1}$ for 30 seconds, is defined as the second viscosity.

The first viscosity is preferably 1,000 mPa·s or less, 500 mPa·s or less, or 100 mPa·s or less.

The second viscosity is preferably 10,000 mPa·s or more, 50,000 mPa·s or more, or 100,000 mPa·s or more.

A recovery time of the viscosity of the present ink is preferably shorter than the time from landing of the present ink to curing upon light irradiation. For example, the recovery time is preferably 10 seconds or less, 5 seconds or less, or 2 seconds or less. As the recovery time is shorter, wet-spreading of the present ink before light irradiation can be suppressed. Thus, smearing of ink and shaping defect of a three-dimensional object can be further suppressed.

The viscosities (mPa·s) of the ink were measured, which were stabilized after an elapse of a sufficient time at a shear rate of $10^{-1}$ (1/s) and at a shear rate of $10^{4}$ (1/s), respectively, at a temperature of 25° C. For the measurement of the viscosities, a rheometer (manufactured by Anton Paar GmbH, trade name: MCR302) or the like can be used. The recovery time of the viscosity of the ink was determined by shearing the ink at a low shear rate ($10^{-1}$ (1/s)) for 10 seconds, then rapidly increasing the shear rate to a high shear rate ($10^{4}$ (1/s)), shearing the ink for 30 seconds, and then decreasing the shear rate to the low shear rate, at a temperature of 25° C., while measuring the viscosity (mPa·s) over time, and measuring a time until the viscosity of the ink subsequently recovered to 80% of the viscosity at the first low shear rate.

For measurement of the viscosity recovery time, a rheometer (manufactured by Anton Paar GmbH, trade name: MCR302) or the like can be used.

(Other Components)

The present ink may contain other components as long as the present invention is not impaired. Examples of other components include a filler, a coloring material, a dispersant, an initiation auxiliary, a plasticizer, a surfactant, a surface modifier, a leveling agent, an antifoaming agent, an antioxidant, a charge imparting agent, a disinfectant, an antiseptic agent, a deodorant, a charge regulator, a wetting agent, an anti-skin agent, a perfume, a pigment derivative, and a solvent. Some of these components may slightly affect the thixotropy of the present ink, but such an influence can be offset by appropriately adjusting the content of the thixotropic agent described above.

Examples of the filler include titanium oxide, zinc oxide (ZnO), zinc dioxide ($ZnO_2$), antimony trioxide, indium tin oxide, aluminum oxide, and barium titanate.

As the coloring material, known dyes and pigments can be used. Examples of the pigment include inorganic pigments and organic pigments.

Examples of the inorganic pigment include titanium oxide, zinc white, zinc oxide, lithopone, iron oxide, aluminum oxide, silicon dioxide, kaolinite, montmorillonite, talc, barium sulfate, calcium carbonate, cadmium red, red iron oxide, molybdenum red, chrome vermilion, molybdate orange, chrome yellow, chromium yellow, cadmium yellow, yellow iron oxide, titanium yellow, chromium oxide, viridian, cobalt green, titanium cobalt green, cobalt chromium green, ultramarine, ultramarine blue, Prussian blue, cobalt blue, cerulean blue, manganese violet, cobalt violet, and mica.

Examples of the organic pigment include azo type, azomethine type, polyazo type, phthalocyanine type, quinacridone type, anthraquinone type, indigo type, thioindigo type, quinophthalone type, benzimidazolone type, isoindoline type, isoindolinone type, and carbon black.

When the present ink is a cyan ink, C.I. Pigment Blue 1, 2, 3, 15:3, 15:4, 15:34, 16, 22, 60, or the like can be blended as the coloring material.

When the present ink is a magenta ink, C.I. Pigment Red 5, 7, 12, 48 (Ca), 48 (Mn), 57 (Ca), 57:1, 112, 122, 123, 168, 184, 202 or 209, C.I. Pigment Violet 19, or the like can be blended as the coloring material.

When the present ink is a yellow ink, C.I. Pigment Yellow 1, 2, 3, 12, 13, 14C, 16, 17, 73, 74, 75, 83, 93, 95, 97, 98, 109, 110, 114, 120, 128, 129, 130, 138, 150, 151, 154, 155, 180, 185 or the like can be blended as the coloring material.

When the present ink is a black ink, HCF, MCF, RCF, LFF, or SCF manufactured by Mitsubishi Chemical Corporation; MONARCH or REGAL manufactured by Cabot Corporation; Color Black, Special Black or Printex manufactured by Degussa-Hills AG; Toka Black manufactured by Tokai Carbon Co., Ltd., Raven manufactured by Columbia Corporation, or the like can be blended.

A content of the coloring material in the present ink is not particularly limited, but, when the coloring material is used, the content thereof is preferably 1 to 20 mass % and more preferably 1 to 10 mass % in the present ink.

When a pigment is used as the coloring material, a dispersant can be incorporated in the present ink in order to disperse the pigment.

Examples of the dispersant include low molecular dispersants and high molecular dispersants, and more specific examples thereof include nonionic, cationic, and anionic surfactants, polyester-based polymer dispersants, acrylic polymer dispersants, and polyurethane-based polymer dispersants.

The present ink can be prepared, for example, by mixing and stirring various initiators and radical polymerizable compounds, and other components to be added as necessary, although not limited by the production method thereof.

Examples of a mixer include a lead screw type feeder, a three-one motor, a magnetic stirrer, a disper, a homogenizer, a container drive medium mill such as a ball mill, a centrifugal mill, and a planetary ball mill, a high-speed rotation mill such as a sand mill, a medium stirring mill such as a stirring tank type mill, a bead mill, and a high-pressure injection mill.

(Effect of Present Ink)

Conventionally, in inkjet printing and additive manufacturing (for example, a method for manufacturing a three-dimensional object by layering ink with a dispenser), in order to improve the quality of printing and shaping (for example, to suppress smearing of ink), improve the speed of shaping (for example, to increase the thickness of the ink to be layered at one time and to increase the layering speed), and the like, the ink landed at the printing position preferably has a high viscosity and does not wet-spread, but such high viscosity ink is likely to clog. In particular, an ink having a viscosity at the time of landing of 10,000 mPa·s or more is preferable for manufacturing a three-dimensional object, but it is difficult to normally eject ink having such a viscosity. That is, there was a trade-off relationship between the ejectability and the printability or shapeability of the ink.

However, according to the present invention, the thixotropy of the ink is suitably adjusted, the viscosity is low to an extent that the ink can be ejected at the time of ejection in which a high shear force is applied to the ink, and the viscosity is high to an extent that the ink hardly wet-spreads at the time of landing in which no shear force is applied to the ink (or only an extremely low shear force is applied), so that both the ejectability and the printability or shapeability of the ink can be achieved. Thus, the present ink can be suitably printed or shaped while maintaining the ejectability.

EXAMPLES

Hereinafter, the present invention will be described based on Examples, but is not limited to these Examples. Performance tests on various ink samples were conducted by the following methods.

(Thixotropy Test)

(1-1) Viscosity/Shear Rate

A rheometer (manufactured by Anton Paar GmbH, trade name: MCR302) was used to measure viscosities (mPa·s) which were stabilized after an elapse of a sufficient time at a shear rate of $10^{-1}$ (1/s) and at a shear rate of $10^4$ (1/s), respectively, at a temperature of 25° C.

(1-2) Recovery Time

Using the rheometer (manufactured by Anton Paar GmbH, trade name: MCR302), the recovery time was determined by shearing the ink at a low shear rate ($10^{-1}$ (1/s)) for 10 seconds, then rapidly increasing the shear rate to a high shear rate ($10^4$ (1/s)), shearing the ink for 30 seconds, and then decreasing the shear rate to the low shear rate, at a temperature of 25° C., while measuring the viscosity (mPa·s) over time, and measuring a time until the viscosity of the ink subsequently recovered to 80% of the viscosity at the first low shear rate.

Example 1

Five (5.0) parts of 2-benzyl-2-(dimethylamino)-4'-morpholinobutyrophenone (manufactured by BASF, trade name:

Irgacure 369) as an aminoalkylphenone-based initiator; 1.5 parts of 2,4,6-trimethylbenzoyl-diphenylphosphineoxide (manufactured by BASF, trade name: TPO) and 2.5 parts of bis(2,4,6-trimethylbenzoyl)phenylphosphineoxide (manufactured by IGM Resins B.V., trade name: Omnirad 819) as phosphine oxide-based initiators; 1.0 parts of 2,4-diethyl-thioxanthen-9-one (manufactured by LAMBSON, trade name: DETX) as a thioxanthone-based sensitizer; 2.0 parts of a functionalized amine joint agent (manufactured by DSM, trade name: Agisyn 008) as an amine-based initiation auxiliary; 52.93 parts of neopentyl glycol PO-modified diacrylate (abbreviated name: NPG (PO) 2DA) (manufactured by Miwon Specialty Chemical Co., Ltd., trade name: Miramer M216, abbreviated name: PONPGDAM216, viscosity: 30 mPa·s (25° C.), acid value: 0.3 mg KOH/g, hydroxyl value: 20 mg KOH/g, molecular weight: 328, refractive index: 1.447) and 30.0 parts of bisphenol AEO-modified (n=10) diacrylate (manufactured by Miwon Specialty Chemical Co., Ltd., trade name: Miramer M2100, abbreviated name: BPE10AM2100, viscosity: 700 mPa·s (25° C.), acid value: 0.2 mg KOH/g, hydroxyl value: 20 mg KOH/g, molecular weight: 770, refractive index: 1.516) as radical polymerizable compounds; 5.0 parts of fumed silica (surface untreated silica, manufactured by Evonik, trade name: Aerosil A300) as a thixotropic agent; and 0.07 parts of a fully crosslinked silicone polyether acrylate (manufactured by Evonik Resource Efficiency GmbH, trade name: TEGORAD2100, short chain siloxane skeleton/long chain organic modified highly crosslinked additive) as a surface modifier were added and mixed to obtain an ink E1.

Example 2

An ink E2 was obtained in the same manner as in Example 1, except that only phosphine oxide-based initiators, i.e., 8.0 parts of 2,4,6-trimethylbenzoyl-diphenylphosphineoxide and 2.0 parts of 2,4-diethylthioxanthen-9-one were used as the initiators; that only 74.9 parts of neopentyl glycol PO-modified diacrylate was used as the radical polymerizable compound; that the content of the thixotropic agent was set to 15.00 parts; and that the content of the surface modifier was set to 0.10 parts.

Example 3

An ink E3 was obtained in the same manner as in Example 1 except that the content of the thioxanthone-based sensitizer was set to 2.0 parts; that only 100 parts of phenoxyethyl acrylate (manufactured by MIWON, trade name: Miramer M140) and 10.0 parts of pentaerythritol triacrylate (manufactured by MIWON, trade name: Miramer M340) were used as the radical polymerizable compounds; and that 8.0 parts of fumed silica (surface treated silica, manufactured by Evonik, trade name: Aerosil R974) was used as the thixotropic agent.

Comparative Example 1

An ink CE1 was obtained in the same manner as in Example 3 except that the content of phenoxyethyl acrylate was set to 108 parts; and that no thixotropic agent was added.

Comparative Example 2

An ink CE2 was obtained in the same manner as in Example 3 except that the content of phenoxyethyl acrylate was set to 100 parts; and that 8.0 parts of fumed silica (surface untreated silica, manufactured by Evonik, trade name: Aerosil A300) was used as the thixotropic agent.

The measurement results of the viscosities of the obtained inks E1, E2, E3, CE1, and CE2 at shear rates 1 (1/s) and 1,000 (1/s), respectively, are shown in Table 1. Calculated values of SP values of the acrylates in the inks E1 and E2 are less than 10, and the calculated values of the SP values of the acrylates in the inks E3, CE1, and CE2 are 10 or more. Table 1 is understood to show that the inks E1, E2, and E3 each had a viscosity of about $10^5$ mPa·s when the shear rate was low, but that the viscosity decreased to about several hundred mPa·s when the shear rate increased, and that these inks E1, E2, and E3 exhibited thixotropy. Furthermore, although the ink E3 exhibited thixotropy, the inks CE1 and CE2 did not exhibit such thixotropy. Therefore, it is considered that, when the solubility parameter of the radical polymerizable compound is 10 or more, the thixotropic agent needs to have a hydrophobic surface.

TABLE 1

| Ink composition | | | | Example 1 | Example 2 | Example 3 | Comparative Example 1 | Comparative Example 2 |
|---|---|---|---|---|---|---|---|---|
| Ink composition | Polymerizable compound | Acrylate | PONPGDAM216 | 52.93 | 74.90 | | | |
| | | | BPE10AM2100 | 30.00 | | | | |
| | | | PEA | | | 100 | 108 | 100 |
| | | | PETA | | | 10 | 10 | 10 |
| | Initiator | Phosphine oxide-based initiator | TPO | 1.50 | 8.00 | 1.50 | 1.50 | 1.50 |
| | | | Omnirad 819 | 2.50 | | 2.50 | 2.50 | 2.50 |
| | | Aminoalkyl phenone-based initiator | Irgacure 369 | 5.00 | | 5.00 | 5.00 | 5.00 |
| | | Amine-based initiator | Agisyn 008 | 2.00 | | 2.00 | 2.00 | 2.00 |
| | | Thioxanthone-based sensitizer | DETX | 1.00 | 2.00 | 2.00 | 2.00 | 2.00 |

TABLE 1-continued

|  |  |  |  | Example 1 | Example 2 | Example 3 | Comparative Example 1 | Comparative Example 2 |
|---|---|---|---|---|---|---|---|---|
|  | Silica |  | Aerosil A300 | 5.00 | 15.00 |  |  |  |
|  |  |  | Aerosil R974 |  |  | 8.00 |  | 8.00 |
|  | Additive | Surface modifier | TEGORAD 2100 | 0.07 | 0.10 | 0.07 | 0.07 | 0.07 |
| Evaluation | Thixotropy | Viscosity η (mPa·s) | $\eta_1$ Shear rate: $10^{-1}$ | 117386 | 91963 | 482000 | 18.5 | 18104 |
|  |  |  | $\eta_2$ Shear rate: $10^4$ | 676 | 59 | 289 | 18.4 | 153 |
|  |  | Recovery time (sec) |  | 2 | 7 | 4 | —* | >300 |

The ink CE1 of Comparative Example 1 did not exhibit thixotropy, and thus the recovery time could not be measured.

As described above, the photocurable inkjet ink according to the first embodiment has the following configurations.

(1) The photocurable inkjet ink contains: a radical polymerizable compound; a photoinitiator; and a thixotropic agent, and has a first viscosity of 1,000 mPa·s or less as measured at a shear rate of 10,000 $s^{-1}$, and a second viscosity of 10,000 mPa·s or more as measured at a shear rate set to $10^{-1}$ $s^{-1}$ after a shear force is continuously applied at the shear rate of 10,000 $s^{-1}$ for 30 seconds.

According to the above configuration, the viscosity of the ink can be made low at the time of ejection to reduce ink clogging, and can be made high at the time of landing onto a medium to favorably perform printing onto the medium and shaping of a three-dimensional object.

(2) The radical polymerizable compound may be an acrylate monomer.

The acrylate monomer is preferable from the viewpoint of polymerizability, durability of a cured product, and solubility of the initiator/sensitizer, and can be used to make the viscosity of the ink low at the time of ejection to reduce ink clogging, and to make the viscosity of the ink high at the time of landing to favorably perform printing onto a medium and shaping of a three-dimensional shaped object.

(3) The thixotropic agent may be fine particles of silicon dioxide.

Fine particles of silicon dioxide are preferable in terms of compatibility with the radical polymerizable compound, particularly, acrylate monomer, and can be used to make the viscosity of the ink low at the time of ejection to reduce ink clogging, and to make the viscosity of the ink high at the time of landing to favorably perform printing onto a medium and shaping of a three-dimensional shaped object.

(4) The solubility parameter of the radical polymerizable compound may be less than 10, and the thixotropic agent may be fine particles having a hydrophilic surface.

When the thixotropic agent is composed of fine particles, by appropriately selecting the affinity of the surface thereof based on the Hildebrand solubility parameter of the radical polymerizable compound, the viscosity of the ink can be made low at the time of ejection to reduce the ink clogging, and can be made high at the time of landing to favorably perform printing onto a medium and shaping of a three-dimensional object.

(5) The fine particles having a hydrophilic surface of the thixotropic agent may be fine particles of silicon dioxide having an untreated surface.

Thus, the viscosity of the ink can be made low at the time of ejection to reduce ink clogging, and can be made high at the time of landing to favorably perform printing onto a medium and shaping of a three-dimensional object.

(6) The solubility parameter of the radical polymerizable compound may be 10 or more, and the thixotropic agent may be fine particles having a hydrophobic surface.

When the thixotropic agent is composed of fine particles, by appropriately selecting the affinity of the surface thereof based on the Hildebrand solubility parameter of the radical polymerizable compound, the viscosity of the ink can be made low at the time of ejection to reduce the ink clogging, and can be made high at the time of landing to favorably perform printing onto a medium and shaping of a three-dimensional object.

Second Embodiment

Hereinafter, a photocurable inkjet ink according to a second embodiment will be described. In a second embodiment, a photocurable inkjet ink suitable for a 3D dispenser will be described. In the following description, the photocurable 3D dispenser ink is also simply referred to as "dispenser ink" or "ink".

The photocurable 3D dispenser ink according to the second embodiment of the present invention contains an aminoalkylphenone-based initiator, a phosphine oxide-based initiator, a thioxanthone-based sensitizer, and a radical polymerizable compound.

A 3D dispenser is a fixed-amount liquid ejection device that extrudes and ejects a fixed volume of liquid, according to control, for three-dimensional shaping.

Figure 2:
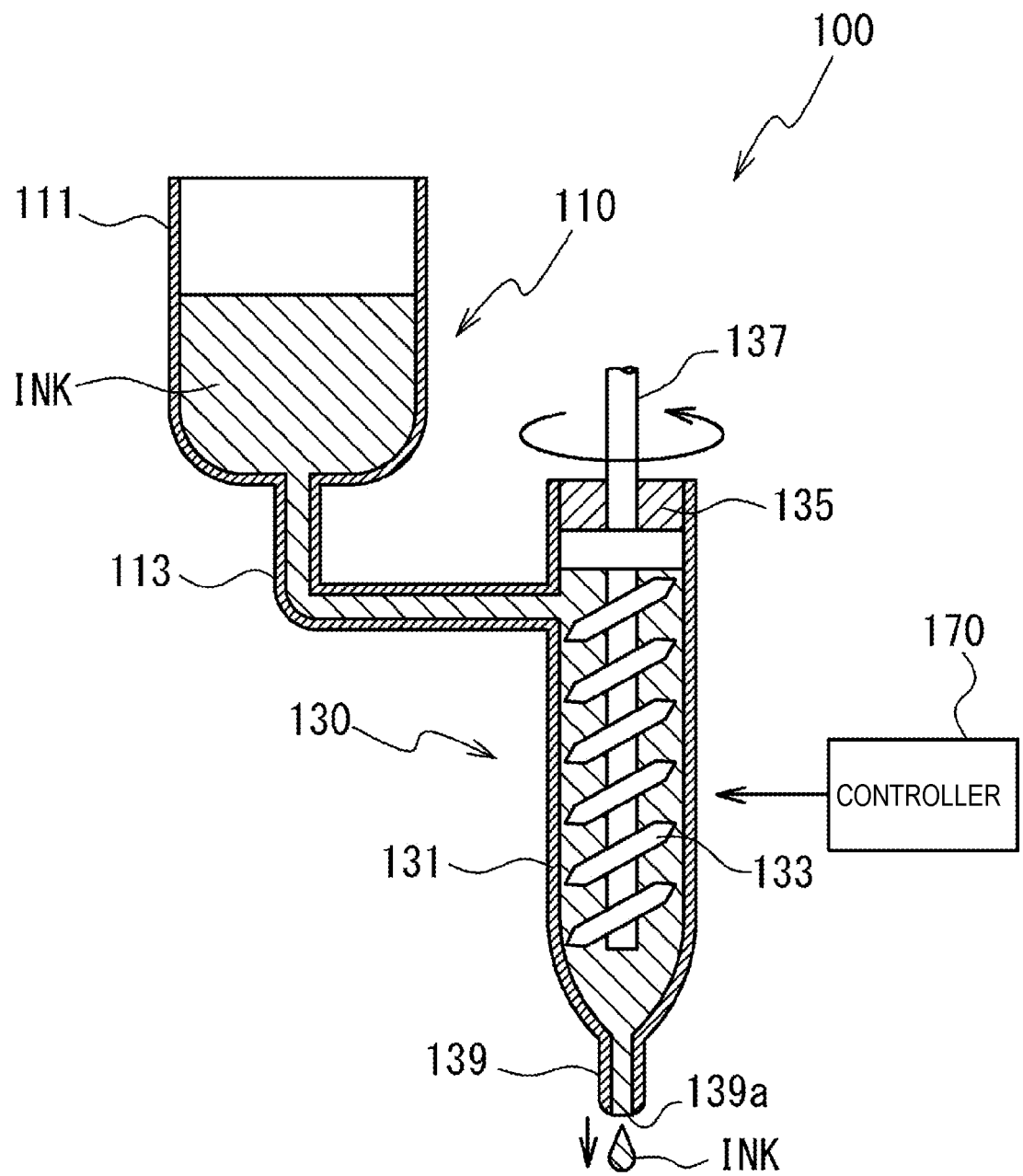
FIG. 2 is a diagram illustrating a configuration of a 3D dispenser.

FIG. 2 is a diagram illustrating a configuration of a 3D dispenser 100. FIG. 2 illustrates a screw dispenser as an example of the 3D dispenser.

As illustrated in FIG. 2, the 3D dispenser 100 includes a supplying unit 110 that supplies an ink INK, and an ejector 130 that ejects the ink INK supplied from the supplying unit 110.

The supplying unit 110 includes a tank 111 that stores the ink INK, and a supply channel 113 that connects the tank 111 and the ejector 130. The ink INK is supplied from the tank 111 to the ejector 130 via the supply channel 113.

The ejector 130 includes a casing 131 that stores the ink INK supplied from the supplying unit 110, and a screw-type rotor 133 held in the casing 131. The screw-type rotor 133 is held inside the casing 131 via a bearing 135. The screw-type rotor 133 is connected to a drive source (not illustrated) and rotates about a rotation shaft 137.

A nozzle 139 for ejecting the ink INK is provided in a lower portion of the casing 131. As the screw-type rotor 133 rotates, the ink INK stored in the casing 131 is pressure-fed downward and ejected from an ejection port 139a at a tip of the nozzle 139.

The 3D dispenser 100 has a controller 170. The controller 170 controls a drive source (not illustrated) of the screw-type rotor 133 to control a rotation speed and a rotation direction of the screw-type rotor 133, and to control an amount of the ink INK ejected from the nozzle 139.

Note that the 3D dispenser 100 is not limited to the screw dispenser, and, for example, an air pulse dispenser or a non-contact jet dispenser may be used.

The dispenser ink used in the 3D dispenser 100 can have a viscosity higher than that of an on-demand type inkjet ink. Specifically, the viscosity at the time of ejection is 10 mPa·s or more, and preferably in a range of 100 to 1,000 mPa·s. When the viscosity of the ink is low, the ink is easily ejected. When the viscosity of the ink is high, deformation of the ink layer during a time from deposition of the ink to curing thereof upon light irradiation is suppressed, and stacking accuracy is improved.

(Initiator/Sensitizer)

When irradiated with light, the initiator generates radicals and cures the radical polymerizable compound. The sensitizer imparts photosensitivity to the initiator for a wavelength region to which the initiator has no photosensitivity, or increases photosensitivity of the initiator. The photocurable 3D dispenser ink according to the present embodiment contains an aminoalkylphenone-based initiator and a phosphine oxide-based initiator as the initiators and a thioxanthone-based sensitizer as the sensitizer.

When only an aminoalkylphenone-based initiator and a thioxanthone-based sensitizer are used or only a phosphine oxide-based initiator and a thioxanthone-based sensitizer are used, the amount of each initiator dissolved is limited, and thus the amount of the initiator is insufficient, and internal curing of the ink is insufficient. However, when the aminoalkylphenone-based initiator, the phosphine oxide-based initiator, and the thioxanthone-based sensitizer are used in combination, a total amount of the initiators dissolved in the ink can be increased, and the internal curability of the ink can be improved by generating a sufficient amount of radicals for curing with light having a wavelength that easily transmits the ink (for example, light having a wavelength of 405 nm).

The aminoalkylphenone-based initiator according to the present embodiment is an aminoalkylphenone compound having an amino group as a substituent in an alkylphenone skeleton represented by the following formula (1).

[Chemical Formula 1]

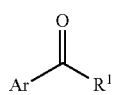

(1)

(In formula (1), Ar represents a substituted or unsubstituted aryl group, and R¹ represents a substituted or unsubstituted hydrocarbon group.)

Specific examples of Ar include a phenyl group, a phenylene group, a tolyl group, a xylyl group, a cumenyl group, and a mesityl group, and examples of $R^1$ include a methyl group, an ethyl group, and a propyl group. Examples of the amino group include a dimethylamino group and a morpholino group.

More specifically, examples of the aminoalkylphenone-based initiator include:

2-methyl-1-[4-(methylthio)phenyl]-2-morpholinopropan-1-one represented by the following Formula (2):

[Chemical Formula 2]

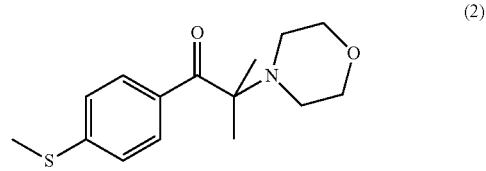

(2)

2-benzyl-2-(dimethylamino)-4'-morpholinobutyrophenone represented by the following formula (3):

[Chemical Formula 3]

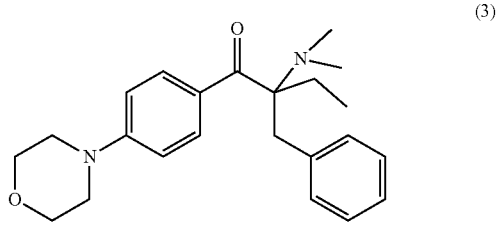

(3)

and 2-dimethylamino-2-(4-methyl-benzyl)-1-(4-morpholin-4-yl-phenyl)-butan-1-one represented by the following formula (4):

[Chemical Formula 4]

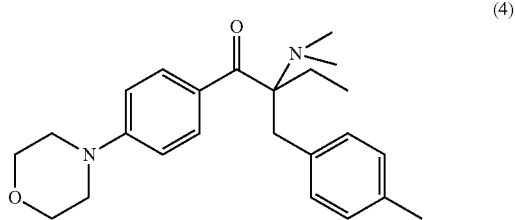

(4)

Among the aminoalkylphenone-based initiators, an α-aminoalkylphenone-based initiator is preferable, and 2-benzyl-2-(dimethylamino)-4'-morpholinobutyrophenone is more preferable.

Examples of the aminoalkylphenone-based initiator that can be used include 2-methyl-1-[4-(methylthio)phenyl]-2-morpholinopropan-1-one (trade name: Omnirad 907 (former trade name of BASF: Irgacure 907)), 2-benzyl-2-(dimethylamino)-4'-morpholinobutyrophenone (trade name: Omnirad 369 (former trade name of BASF: Irgacure 369)), and 2-dimethylamino-2-(4-methyl-benzyl)-1-(4-morpholin-4-yl-phenyl)-butan-1-one (trade name: Omnirad 379EG (former trade name of BASF: Irgacure 379EG)), manufactured by IGM Resins B.V. The aminoalkylphenone-based initiators may be used singly, or two or more thereof may be used in combination.

A content of the aminoalkylphenone-based initiator in the dispenser ink is not particularly limited, but is preferably 1 to 10 mass %, and more preferably 4 to 6 mass %.

The phosphine oxide-based initiator according to the present embodiment is a phosphine oxide compound represented by the following Formula (5).

[Chemical Formula 5]

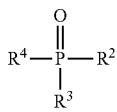
(5)

(In formula (5), $R^2$, $R^3$, and $R^4$ each independently represent hydrogen or a substituted or unsubstituted hydrocarbon group.)

Specifically, $R^2$, $R^3$, and $R^4$ are each independently a phenyl group, an acyl group or the like.

More specifically, examples of the phosphine oxide-based initiator include:

2,4,6-trimethylbenzoyl-diphenylphosphineoxide represented by the following formula (6):

[Chemical Formula 6]

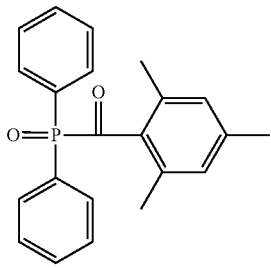
(6)

and
bis(2,4,6-trimethylbenzoyl)phenylphosphineoxide represented by the following formula (7):

[Chemical Formula 7]

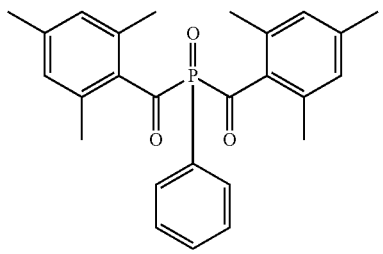
(7)

The phosphine oxide-based initiator is preferably an acylphosphine oxide-based photopolymerization initiator, and 2,4,6-trimethylbenzoyl-diphenylphosphineoxide and bis(2,4,6-trimethylbenzoyl)phenylphosphineoxide are more preferable.

As the phosphine oxide-based initiator, for example, 2,4,6-trimethylbenzoyl-diphenylphosphineoxide (trade name: Omnirad TPOH (former trade name of BASF: Irgacure TPO)) and bis(2,4,6-trimethylbenzoyl)phenylphosphineoxide (trade name: Omnirad 819 (former trade name of BASF: Irgacure 819)) manufactured by IGM Resins B.V. can be used. The phosphine oxide-based initiators may be used singly, or two or more thereof may be used in combination.

A content of the phosphine oxide-based initiator in the dispenser ink is not particularly limited, but is preferably 1 to 10 mass %, and more preferably 2 to 4 mass %.

The thioxanthone-based sensitizer according to the present embodiment is a compound having a thioxanthone skeleton represented by the following formula (8).

[Chemical Formula 8]

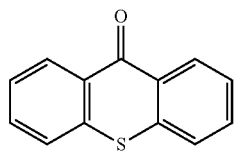
(8)

Examples of the thioxanthone-based sensitizer include unsubstituted thioxanthone and thioxanthone compounds having a hydrocarbon group such as a methyl group, an ethyl group, or a propyl group as a substituent. Among them, unsubstituted thioxanthone is preferable.

More specifically, examples of the thioxanthone-based sensitizer include thioxanthone, 2,4-diethyl-9H-thioxanthen-9-one, and 2-isopropylthioxanthone.

As the thioxanthone-based sensitizer, for example, thioxanthone manufactured by Tokyo Chemical Industry Co., Ltd., 2,4-diethyl-9H-thioxanthen-9-one manufactured by Wako Pure Chemical Industries, Ltd., and 2-isopropylthioxanthone manufactured by Tokyo Chemical Industry Co., Ltd. can be used. The thioxanthone-based sensitizers may be used singly, or two or more thereof may be used.

A content of the thioxanthone-based sensitizer in the dispenser ink is not particularly limited, but is preferably 0.1 to 10 mass %, and more preferably 0.5 to 1.5 mass %.

The photocurable 3D dispenser ink according to the second embodiment can contain other initiators/sensitizers. Examples of other initiators/sensitizers include an intramolecular hydrogen abstraction type photopolymerization initiator, a cationic photopolymerization initiator, and an electron transfer type photopolymerization initiator.

Specifically, as such other initiators, for example, a functionalized amine joint agent (manufactured by DSM, trade name: Agisyn 008) as the amine-based initiator can be used.

A total content of the initiator and the sensitizer in the dispenser ink is not particularly limited, but is preferably 1 mass % to 25 mass %, preferably 5 mass % to 20 mass %, and particularly preferably 10 mass % to 15 mass %. A content rate of the curing agent within this range is preferable from the viewpoint of reactivity of the radical polymerizable compound.

Content proportions of the aminoalkylphenone-based initiator, the phosphine oxide-based initiator, and the thioxanthone-based sensitizer in the total initiator in the dispenser ink are not particularly limited, but the content proportion of the aminoalkylphenone-based initiator is preferably 20 mass % to 60 mass %, more preferably 30 mass % to 50 mass %, and particularly preferably 35 mass % to 45 mass % with respect to the total amount of the initiators and the sensitizer.

In addition, the content proportion of the phosphine oxide-based initiator is preferably 20 mass % to 50 mass %, more preferably 25 mass % to 45 mass %, and particularly preferably 30 mass % to 40 mass % with respect to the total amount of the initiators and the sensitizer.

In addition, the content proportion of the thioxanthone-based sensitizer is preferably 5 mass % to 20 mass %, more preferably 5 mass % to 15 mass %, and particularly preferably 5 mass % to 10 mass %, with respect to the total amount of the initiators and the sensitizer. Content rates of the respective initiators and sensitizer, when falling within these ranges, are preferable from the viewpoint of the reactivity of the radical polymerizable compound.

(Radical Polymerizable Compound)

The radical polymerizable compound according to the second embodiment is not particularly limited as long as it is a compound having radical polymerizability, but an acrylate is preferable in terms of polymerizability, durability of a cured product, solubility of the initiator/sensitizer, and the like.

Examples of the acrylate include monofunctional acrylates such as phenol EO-modified acrylate, nonylphenol EO-modified acrylate, and ethoxydiethylene glycol acrylate; difunctional acrylates such as hexanediol diacrylate, hexanediol EO-modified diacrylate, hydroxypivalic acid neopentyl glycol diacrylate, neopentyl glycol PO-modified diacrylate, tripropylene glycol diacrylate, dipropylene glycol diacrylate, bisphenol AEO-modified diacrylate, polyethylene glycol diacrylate, and polypropylene glycol diacrylate; and polyfunctional acrylates such as trimethylolpropane triacrylate, trimethylolpropane EO-modified triacrylate, trimethylolpropane PO-modified triacrylate, glycerin propoxy triacrylate, pentaerythritol triacrylate, pentaerythritol EO-modified tetraacrylate, ditrimethylolpropane tetraacrylate, and dipentaerythritol hexaacrylate.

These radical polymerizable compounds can be used singly, or two or more thereof may be used in combination.

Among them, a bifunctional acrylate is preferable, and a combination of PO-modified neopentyl glycol PO-modified diacrylate and bisphenol AEO-modified diacrylate is more preferable, from the viewpoint of mechanical properties such as durability and rigidity of the resulting shaped object.

Examples of the monofunctional acrylate that can be used include phenol EO-modified (n=2) acrylate (trade name: Miramer M142), phenol EO-modified (n=4) acrylate (trade name: Miramer M144), nonylphenol EO-modified (n=8) acrylate (trade name: Miramer M166), and ethoxydiethylene glycol acrylate (trade name: Miramer M170), manufactured by Miwon Specialty Chemical Co., Ltd.

Examples of the bifunctional acrylate that can be used include hexanediol diacrylate (trade name: Miramer M200), hexanediol EO-modified diacrylate (trade name: Miramer M202), hydroxypivalic acid neopentyl glycol diacrylate (trade name: Miramer M210), neopentyl glycol PO-modified (n=2) diacrylate (trade name: Miramer M216), tripropylene glycol diacrylate (trade name: Miramer M220), dipropylene glycol diacrylate (trade name: Miramer M222), bisphenol AEO-modified (n=4) diacrylate (trade name: Miramer M240), bisphenol AEO-modified (n=10) diacrylate (trade name: Miramer M2100), polyethylene glycol (molecular weight: 400) diacrylate (abbreviated name: PEG400DA, trade name: Miramer M280), polyethylene glycol (molecular weight: 300) diacrylate (abbreviated name: PEG300DA, trade name: Miramer M284), and polypropylene glycol diacrylate (trade name: Miramer M2040), manufactured by Miwon Specialty Chemical Co., Ltd.

Examples of the polyfunctional acrylate that can be used include trimethylolpropane triacrylate (trade name: Miramer M300), trimethylolpropane EO-modified (n=3) triacrylate (trade name: Miramer M3130), trimethylolpropane EO-modified (n=6) triacrylate (trade name: Miramer M3160), trimethylolpropane EO-modified (n=9) triacrylate (trade name: Miramer M3190), trimethylolpropane PO-modified (n=3) triacrylate (trade name: Miramer M360), glycerin propoxy triacrylate (trade name: Miramer M320), pentaerythritol triacrylate (trade name: Miramer M340), and pentaerythritol EO-modified tetraacrylate (trade name: Miramer M4004), dimethylolpropane tetraacrylate (trade name: Miramer M410), and dipentaerythritol hexaacrylate (trade name: Miramer M600), manufactured by Miwon Specialty Chemical Co., Ltd.

The content of the radical polymerizable compound in the dispenser ink is not particularly limited, but is preferably 70 to 99 mass %, more preferably 75 to 90 mass %, and particularly preferably 80 to 85 mass %.

(Other Components)

The dispenser ink of the second embodiment may contain other components as long as the present invention is not impaired. Examples of other components include a filler, a coloring material, a dispersant, a plasticizer, a surfactant, a surface modifier, a leveling agent, an antifoaming agent, an antioxidant, a charge imparting agent, a disinfectant, an antiseptic agent, a deodorant, a charge regulator, a wetting agent, an anti-skin agent, a perfume, a pigment derivative, and a solvent.

Examples of fillers include fumed silica such as hydrophilic fumed silica and hydrophobic fumed silica, silica such as mesoporous silica, and alumina. Among these fillers, hydrophilic fumed silica is preferable. By adding the hydrophilic fumed silica to the ink, thixotropy can be imparted to the ink. As the hydrophilic fumed silica, Aerosil A255, Aerosil A300, Aerosil A380, and the like manufactured by AEROSIL CO., LTD. can be used.

As the coloring material, known dyes and pigments can be used. Examples of the pigment include inorganic pigments and organic pigments.

Examples of the inorganic pigment include titanium oxide, zinc white, zinc oxide, lithopone, iron oxide, aluminum oxide, silicon dioxide, kaolinite, montmorillonite, talc, barium sulfate, calcium carbonate, silica, alumina, cadmium red, red iron oxide, molybdenum red, chrome vermilion, molybdate orange, chrome yellow, chromium yellow, cadmium yellow, yellow iron oxide, titanium yellow, chromium oxide, viridian, cobalt green, titanium cobalt green, cobalt chromium green, ultramarine, ultramarine blue, Prussian blue, cobalt blue, cerulean blue, manganese violet, cobalt violet, and mica.

Examples of the organic pigment include azo type, azomethine type, polyazo type, phthalocyanine type, quinacridone type, anthraquinone type, indigo type, thioindigo type, quinophthalone type, benzimidazolone type, isoindoline type, isoindolinone type, and carbon black.

When the dispenser ink of the second embodiment is a cyan ink, C.I. Pigment Blue 1, 2, 3, 15:3, 15:4, 15:34, 16, 22, 60, or the like can be blended as the coloring material.

When the dispenser ink of the second embodiment is a magenta ink, C.I. Pigment Red 5, 7, 12, 48 (Ca), 48 (Mn), 57 (Ca), 57:1, 112, 122, 123, 168, 184, 202 or 209, C.I. Pigment Violet 19, or the like can be blended as the coloring material.

When the dispenser ink of the second embodiment is a yellow ink, C.I. Pigment Yellow 1, 2, 3, 12, 13, 14C, 16, 17, 73, 74, 75, 83, 93, 95, 97, 98, 109, 110, 114, 120, 128, 129, 130, 138, 150, 151, 154, 155, 180, 185 or the like can be blended as the coloring material.

When the dispenser ink of the second embodiment is a black ink, HCF, MCF, RCF, LFF, or SCF manufactured by Mitsubishi Chemical Corporation; MONARCH or REGAL manufactured by Cabot Corporation; Color Black, Special Black or Printex manufactured by Degussa-Hills AG; Toka Black manufactured by Tokai Carbon Co., Ltd., Raven manufactured by Columbia Corporation, or the like can be blended.

A content of the coloring material in the dispenser ink is not particularly limited, but, when the coloring material is used, the content thereof is preferably 1 to 20 mass % and more preferably 1 to 10 mass % in the dispenser ink.

When a pigment is used as the coloring material, a dispersant can be incorporated in the dispenser ink in order to disperse the pigment.

Examples of the dispersant include a low molecular dispersant and a high molecular dispersant. More specific examples of the dispersant include nonionic, cationic, and anionic surfactants, polyester-based polymer dispersants, acryl-based polymer dispersants, and polyurethane-based polymer dispersants.

The dispenser ink of the second embodiment can be prepared, for example, by mixing and stirring various initiators and radical polymerizable compounds, and other components to be added as necessary, although not limited by the production method thereof.

Examples of a mixer include a lead screw type feeder, a three-one motor, a magnetic stirrer, a disper, a homogenizer, a container drive medium mill such as a ball mill, a centrifugal mill, and a planetary ball mill, a high-speed rotation mill such as a sand mill, a medium stirring mill such as a stirring tank type mill, a bead mill, and a high-pressure injection mill.

(Manufacture of Three-Dimensional Object)

Hereinafter, one aspect of manufacture of a three-dimensional object using the photocurable 3D dispenser ink according to the second embodiment will be described.

Figure 3:
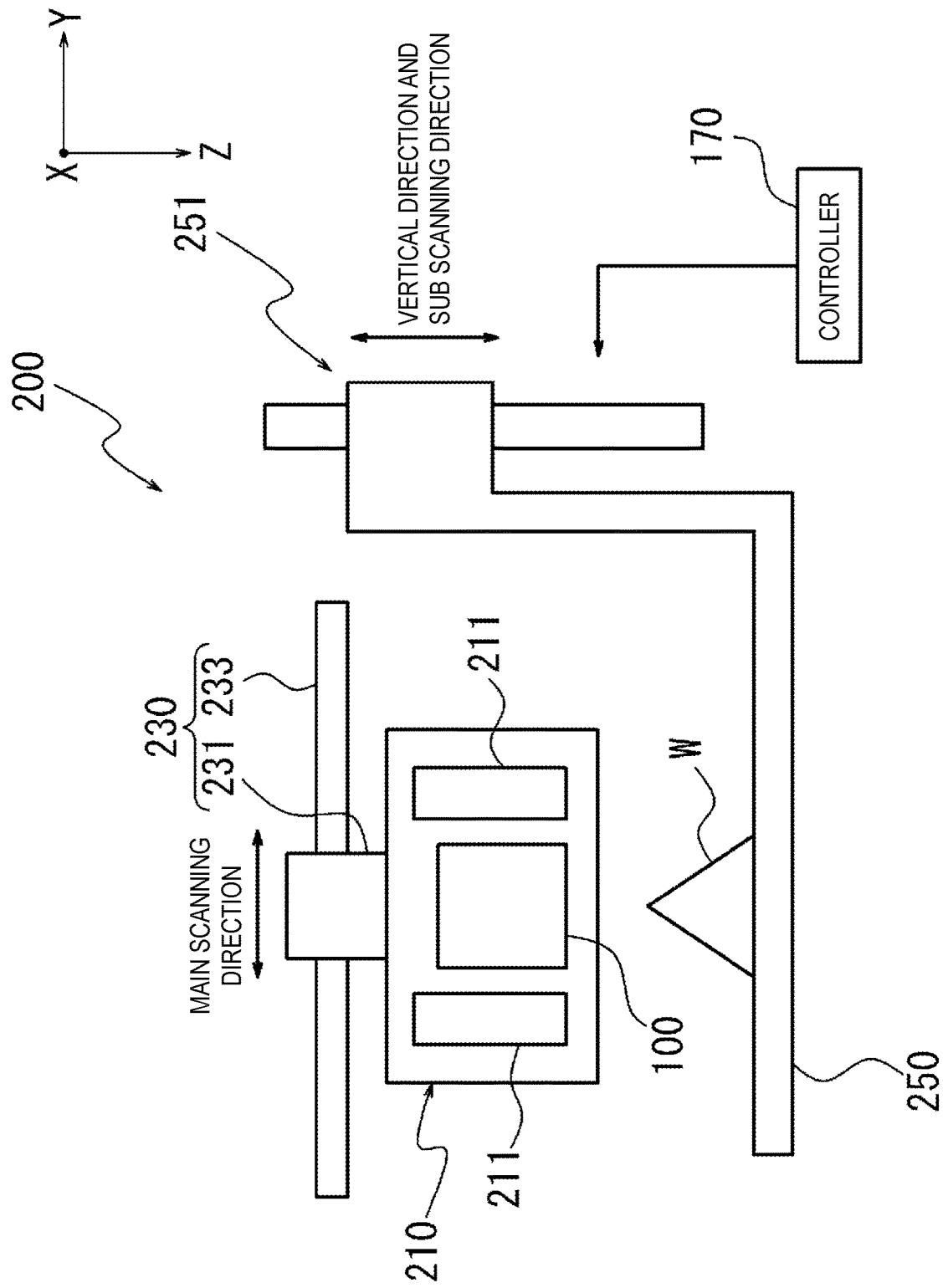
FIG. 3 is a diagram illustrating one example of a configuration of a 3D printer that manufactures a three-dimensional object.

FIG. 3 is a diagram illustrating one example of a configuration of a 3D printer 200 that manufactures a three-dimensional object.

As illustrated in FIG. 3, the 3D printer 200 includes a dispenser unit 210, a main scan driving unit 230, a shaping table 250 which is a mounting stand for mounting a three-dimensional object W, and a controller 170.

The dispenser unit 210 includes the 3D dispenser 100 which ejects ink as shown in FIG. 2. The dispenser unit 210 also includes a light irradiation device 211 that irradiates the ink ejected from the 3D dispenser 100 with light such as ultraviolet light to cure the ink.

The main scan driving unit 230 includes a carriage 231 that holds the dispenser unit 210 so as to face the shaping table 250, and a guide rail 233 that movably supports the carriage 231 in a main scanning direction (Y direction in the figure).

The shaping table 250 includes a moving mechanism 251 that moves an upper surface on which the three-dimensional object W is placed in a vertical direction (Z direction in the figure) and a sub scanning direction (X direction in the figure).

The controller 170 controls operations of the 3D dispenser 100 and the light irradiation device 211 of the dispenser unit 210, the main scan driving unit 230, and the moving mechanism 251 of the shaping table 250, and may be the same as the controller 170 illustrated in FIG. 2.

The method for manufacturing a three-dimensional object according to the second embodiment of the present invention includes an ink ejecting step of ejecting ink with the 3D dispenser 100 of the 3D printer 200 to form an ink layer, and a curing step of irradiating the formed ink layer with light having any wavelength ranging from 405 nm to 420 nm with the light irradiation device 211 to cure the ink layer to form a cured layer. By performing the ink ejecting step and the curing step a plurality of times, a three-dimensional object formed of a plurality of layers is obtained. Usually, the ink ejecting step and the curing step are alternately performed, but the curing step may be performed after the ink ejecting step is performed a plurality of times.

Specifically, the controller 170 controls the main scan driving unit 230 to move the carriage 231 in the main scanning direction (Y direction) along the guide rail 233, thereby ejecting and curing the ink while moving the dispenser unit 210 in the main scanning direction. Next, the controller 170 controls the moving mechanism 251 of the shaping table 250 to move the shaping table 250 in the sub scanning direction (X direction), and then controls the main scan driving unit 230 again to repeat the ejection and curing of the ink in the main scanning direction (Y direction). After forming one ink layer, the controller 170 controls the moving mechanism 251 to move the shaping table 250 in a direction away from the dispenser unit 210 in the Z direction by the thickness of one ink layer. The controller 170 controls ejection and curing so as to form the next ink layer so as to stack it on the formed ink layer in the Z direction.

The method for forming a pattern of each layer is similar to the conventional three-dimensional shaping method, but the dispenser ink according to the second embodiment is excellent in internal curability, and thus the thickness of each layer of the ink layer to be formed can be increased by increasing the amount of the ink ejected from the dispenser, and the number of times of layering can be reduced, so excellent productivity is obtained. Furthermore, since a time between ejection of the ink in the ink ejecting step and curing of the ink by the light irradiation device 211 is short, a three-dimensional object with high pattern accuracy and high accuracy can be obtained.

(Ink Ejecting Step)

In the ink ejecting step, the dispenser ink is ejected by using the 3D dispenser 100 to form an ink layer.

The amount of the ink ejected from the nozzle is not particularly limited, and is, for example, an amount by which the thickness of the deposited ink layer is 0.1 mm to 2 mm. The thickness of the ink layer is preferably 1 mm to 2 mm. The dispenser ink of the second embodiment is excellent in photocurability at a wavelength of 405 nm or more which can transmit a thick ink layer, and, even when the thickness of the layer is set to about 1 mm to 2 mm, the surface and inner surface thereof can be cured. When the thickness of the ink is in this range, the number of layers constituting the three-dimensional object can be reduced, so the productivity is improved.

When the curing step is performed after the ink ejecting step is performed a plurality of times, the total thickness of the ink layers to be cured is preferably 1 mm to 2 mm.

The ink to be ejected has a viscosity, for example, in the range of 100 mPa·s to 1,000 mPa·s. When the viscosity of the ink to be ejected is 1,000 mPa·s or less, the ink can be ejected as it is.

Further, when the viscosity of the ink left to stand exceeds $1 \times 10^4$ mPa·s and the ink exhibits thixotropy, the ink whose viscosity has been reduced by shearing with a lead screw type feeder is ejected from the dispenser nozzle. When the viscosity of the ink is low at the time of high shear, the ink is easily ejected. As the viscosity of the ink after deposition is higher, deformation of the ink layer during the time from deposition of the ink to curing upon light irradiation is suppressed, and stacking accuracy is improved.

(Curing Step)

In the curing step, the ink layer formed in the ink ejecting step is irradiated with light having any wavelength ranging from 405 nm to 420 nm to cure the ink layer, thereby forming a cured layer.

The irradiation light is not particularly limited as long as the irradiation light includes light having any wavelength ranging from 405 nm to 420 nm. For example, light from an LED light source having a wavelength of 405 nm can be emitted. Light having a wavelength of 405 nm to 420 nm transmits the ink layer and reaches the inside thereof. The photocurable 3D dispenser ink of the present embodiment exhibits excellent curability even for irradiation light having a wavelength of 405 nm or more in addition to the wavelength of 365 nm or 385 nm used for normal ultraviolet curing, so that the outside and inside of the ink layer can be cured.

The ink according to the second embodiment has low transmissivity of light having an ultraviolet wavelength such as a wavelength of 365 nm or a wavelength of 385 nm. Therefore, when a light source having these wavelengths is used, only the surface is cured, and the inside is hardly cured. However, by irradiating the ink with light having a wavelength of 365 nm or a wavelength of 385 nm in addition to irradiation light having a wavelength of 405 nm to 420 nm, surface curing can be promoted in addition to internal curing of the ink layer.

(Manufacturing Apparatus)

The manufacturing apparatus used for manufacturing a three-dimensional object of the present embodiment is not limited to the apparatus illustrated in FIG. 3, and a three-dimensional object shaping apparatus including a dispenser unit, a mounting stand on which a shaped object is mounted, a light source (for example, an LED having a wavelength of 405 nm) that irradiates the shaped object with light having any wavelength ranging from 405 nm to 420 nm, a driving unit that relatively moves the mounting stand and the dispenser unit, and a control unit that controls an operation of the driving unit based on the shape information of the three-dimensional object can be appropriately used.

EXAMPLES

Hereinafter, the second embodiment will be described based on Examples, but the present invention is not limited to these Examples. Performance tests on various ink samples were conducted by the following methods.

(Performance Test)

(1) Thixotropy (1-1) Viscosity/Shear Rate

A rheometer (manufactured by Anton Paar GmbH, trade name: MCR302) was used to measure viscosities (mPa·s) which were stabilized after an elapse of a sufficient time at a shear rate of $10^{-1}$ (1/s) and at a shear rate of $10^4$ (1/s), respectively, at a temperature of 25° C.

(1-2) Recovery Time

Using the rheometer (manufactured by Anton Paar GmbH, trade name: MCR302), the recovery time was determined by shearing the ink at a low shear rate ($10^{-1}$ (1/s)) for 10 seconds, then rapidly increasing the shear rate to a high shear rate ($10^4$ (1/s)), shearing the ink for 30 seconds, and then decreasing the shear rate to the low shear rate, at a temperature of 25° C., while measuring the viscosity (mPa·s) over time, and measuring a time until the viscosity of the ink subsequently recovered to 80% of the viscosity at the first low shear rate.

(2) Curability

An ink was applied onto a flat plate using an applicator for a predetermined film thickness to obtain an ink layer sample. The obtained ink layer sample was scanned at a scanning speed of 33.8 cm/s with a light source, with a predetermined wavelength and a predetermined output, set in a 1-pass tester, and irradiated with light at an exposure amount of 22811 mJ/cm$^2$.

The surface of the coating film after irradiation was stroked with a finger to perform three-stage evaluation: "dry" (○), "adhesive" (Δ), and "ink attached and not cured" (×). In addition, regarding the inside of the coating film after light irradiation, the coating film was pressed with a finger to perform three-stage evaluation: "hard" (○), "elastic" (Δ), and "recessed" (×).

(3) Film Performance (3-1) Hardness

Measurement was performed under the condition of Shore A in accordance with JIS K 7215.

(3-2) Impact Resistance

According to JIS K 5600-5-3, measurement was performed under the conditions: a weight of 500 g, a diameter of an impact core end of ½ inch, and a punch die and a cradle of 50 cm.

(3-3) Bending

Measurement was performed under the condition: a film thickness of 0.5 mm using a mandrel bending tester.

Example 2-1

Five (5.0) parts of 2-benzyl-2-(dimethylamino)-4'-morpholinobutyrophenone (manufactured by BASF, trade name: Irgacure 369) as an aminoalkylphenone-based initiator; 1.5 parts of 2,4,6-trimethylbenzoyl-diphenylphosphineoxide (manufactured by BASF, trade name: TPO) and 2.5 parts of bis(2,4,6-trimethylbenzoyl)phenylphosphineoxide (manufactured by IGM Resins B.V., trade name: Omnirad 819) as phosphine oxide-based initiators; 1.0 parts of 2,4-diethylthioxanthen-9-one (manufactured by LAMBSON, trade name: DETX) as a thioxanthone-based sensitizer; 2.0 parts of a functionalized amine joint agent (manufactured by DSM, trade name: Agisyn 008) as an amine-based initiator; 52.93 parts of neopentyl glycol PO-modified diacrylate (abbreviated name: NPG (PO) 2DA) (manufactured by Miwon Specialty Chemical Co., Ltd., trade name: Miramer M216, (abbreviated name: PONPGDAM216), viscosity: 30 mPa·s (25° C.), acid value: 0.3 mg KOH/g, hydroxyl value: 20 mg KOH/g, molecular weight: 328, refractive index: 1.447) and 30.0 parts of bisphenol AEO-modified (n=10) diacrylate (abbreviated name: BPA (EO) 10DA) (manufactured by Miwon Specialty Chemical Co., Ltd., trade name: Miramer M2100 (abbreviated name: BPE10AM2100), viscosity: 700 mPa·s (25° C.), acid value: 0.2 mg KOH/g, hydroxyl value: 20 mg KOH/g, molecular weight: 770, refractive index: 1.516) as radical polymerizable compounds; and 5.0 parts of fumed silica (surface untreated silica, manufactured by Evonik, trade name: Aerosil A300) and 0.07 parts of a fully crosslinked silicone polyether acrylate (manufactured by Evonik Resource Efficiency GmbH, trade name: TEGORAD2100, short chain siloxane skeleton/long chain organic modified highly crosslinked additive) as a silicone-based surface modifier, as other additives, were added and mixed to obtain an ink T1.

The measurement results of the viscosities of the obtained ink T1 at shear rates 1 (1/s) and 1,000 (1/s), respectively, are shown in Table 2. Table 2 is understood to show that the viscosity was about $10^6$ mPa·s when the shear rate was low, but that the viscosity decreased to about several hundred mPa·s when the shear rate increased, and that the ink T1 exhibited thixotropy.

The obtained ink T1 was sheared at a shear rate of 1,000 (1/s) into a viscosity of 676 (mPa·s). The ink T1 in this state was applied onto a flat plate using applicators for film thicknesses of 0.5 mm, 1.0 mm, 1.5 mm, and 2.0 mm to obtain ink layer samples T1-1 (film thickness: 0.5 mm), T1-2 (film thickness: 1.0 mm), T1-3 (film thickness: 1.5 mm), and T1-4 (film thickness: 2.0 mm).

The ink layer samples T1-1, T1-2, T1-3, and T1-4 were each scanned at a scanning speed of 33.8 cm/s with a light source (wavelength: 405 nm, output: 2500 mW/cm$^2$) set in a 1-pass tester, and irradiated with light at an exposure amount of 22811 mJ/cm$^2$ to evaluate curability. The evaluation results are indicated in Table 1. All the ink layer samples cured well.

Example 2-2

An ink T2 was obtained in the same manner as in Example 2-1, except that the amounts of neopentyl glycol PO-modified diacrylate and bisphenol AEO-modified (n=10) diacrylate as the radical polymerizable compounds were changed to 67.93 parts and 15.0 parts, respectively.

The obtained ink T2 was applied onto a flat plate using applicators for film thicknesses of 0.5 mm, 1.0 mm, 1.5 mm, and 2.0 mm to obtain ink layer samples T2-1 (film thickness: 0.5 mm), T2-2 (film thickness: 1.0 mm), T2-3 (film thickness: 1.5 mm), and T2-4 (film thickness: 2.0 mm).

The ink layer samples T2-1, T2-2, T2-3, and T2-4 were each scanned at a scanning speed of 33.8 cm/s with a light source (wavelength: 405 nm, output: 2500 mW/cm$^2$) set in a 1-pass tester, and irradiated with light at an exposure amount of 22811 mJ/cm$^2$ to evaluate curability. The evaluation results are indicated in Table 1. The surfaces and insides of the ink layer samples T2-1 and T2-2 having a film thickness of 1 mm or less cured well.

Example 2-3

An ink T3 was obtained in the same manner as in Example 2-1, except that no functionalized amine joint agent (manufactured by DSM, trade name: Agisyn 008) as the amine-based initiator was used; that only 84.95 parts of neopentyl glycol PO-modified diacrylate was used as the radical polymerizable compound; and that the amount of TEGORAD2100 as the silicone-based surface modifier was changed to 0.05 parts.

The obtained ink T3 was applied onto a flat plate using applicators for film thicknesses of 0.5 mm, 1.0 mm, 1.5 mm, and 2.0 mm to obtain ink layer samples T3-1 (film thickness: 0.5 mm), T3-2 (film thickness: 1.0 mm), T3-3 (film thickness: 1.5 mm), and T3-4 (film thickness: 2.0 mm).

The ink layer samples T3-1, T3-2, T3-3, and T3-4 were each scanned at a scanning speed of 33.8 cm/s with a light source (wavelength: 405 nm, output: 2500 mW/cm$^2$) set in a 1-pass tester, and irradiated with light at an exposure amount of 22811 mJ/cm$^2$ to evaluate curability. The evaluation results are indicated in Table 1. The insides of the ink layer sample T3-3 having a film thickness of 1.5 mm and the ink layer sample T3-4 having a film thickness of 2.0 mm cured poorly, whereas the surfaces and insides of the ink layer samples T3-1 and T3-2 having a film thickness of 1 mm or less cured well.

Comparative Example 2-1

An ink T4 was obtained in the same manner as in Example 2-1 except that 8.0 parts of 2,4,6-trimethylbenzoyl-diphenylphosphineoxide was used as the phosphine oxide-based initiator; that only 2.0 parts of 2,4-diethylthioxanthen-9-one was used as the thioxanthone-based sensitizer; that only 74.9 parts of neopentyl glycol PO-modified diacrylate was used as the radical polymerizable compound; and that 0.10 parts of TEGORAD 2100 as the silicone-based surface modifier was used.

The obtained ink T4 was applied onto a flat plate using applicators for film thicknesses of 0.5 mm, 1.0 mm, 1.5 mm, and 2.0 mm to obtain ink layer samples T4-1 (film thickness: 0.5 mm), T4-2 (film thickness: 1.0 mm), T4-3 (film thickness: 1.5 mm), and T4-4 (film thickness: 2.0 mm).

The ink layer samples T4-1, T4-2, T4-3, and T4-4 were each scanned at a scanning speed of 33.8 cm/s with a light source (wavelength: 385 nm, output: 7900 mW/cm$^2$) set in a 1-pass tester, and irradiated with light at an exposure amount of 2883 mJ/cm$^2$ to evaluate curability. The evaluation results are indicated in Table 1. The inside of the ink layer sample T4-1 also cured, whereas the insides of the ink layer samples T4-2, T4-3, and T4-4 cured insufficiently. It is inferred that, since the ink layers T4-2, T4-3, and T4-4 were thick, the light from the light source did not reach the inside of the ink layer so that no radicals were generated.

The ink layer samples T4-1, T4-2, T4-3, and T4-4 were each scanned at a scanning speed of 33.8 cm/s with a light source (wavelength: 405 nm, output: 2500 mW/cm$^2$) set in a 1-pass tester, and irradiated with light at an exposure amount of 22811 mJ/cm$^2$ to evaluate curability. The evaluation results are indicated in Table 1. The inside of the ink layer sample T4-1 also cured, but the insides of the other samples cured insufficiently. It is inferred that, although light was transmitted to the insides of the ink layers, the amount of radicals generated in the ink layers was insufficient.

TABLE 2

| | | | | Example 2-1 | Example 2-2 | Example 2-3 | Comparative Example 2-1 |
|---|---|---|---|---|---|---|---|
| Ink composition | Polymerizable compound | Acrylate | PONPGADA M216 | 52.93 | 67.93 | 84.95 | 74.90 |
| | | | BPE10A M2100 | 30.00 | 15.00 | | |
| | Initiator/ sensitizer | Phosphine oxide-based initiator | TPO | 1.50 | 1.50 | 1.50 | 8.00 |
| | | | Omnirad 819 | 2.50 | 2.50 | 2.50 | |

TABLE 2-continued

|  |  |  |  | Example 2-1 | Example 2-2 | Example 2-3 | Comparative Example 2-1 |
|---|---|---|---|---|---|---|---|
|  |  | Aminoalkylphenone-based initiator | Irgacure 369 | 5.00 | 5.00 | 5.00 |  |
|  |  | Amine-based initiator | Agisyn 008 | 2.00 | 2.00 |  |  |
|  |  | Thioxanthone-based sensitizer | DETX | 1.00 | 1.00 | 1.00 | 2.00 |
|  | Silica |  | Aerosil A300 | 5.00 | 5.00 | 5.00 | 15.00 |
|  | Additive | Silicon-based surface modifier | TEGORAD 2100 | 0.07 | 0.007 | 0.055 | 0.10 |
| Evaluation | Appearance |  |  | Transparent/ yellow | Transparent/ yellow | Transparent/ yellow | Transparent/ yellow |
|  | Curability 385 mm | Film thickness 0.5 mm | Surface |  |  |  | ◯ |
|  |  |  | Inside |  |  |  | Δ |
|  |  | 1.0 mm | Surface |  |  |  | ◯ |
|  |  |  | Inside |  |  |  | X |
|  |  | 1.5 mm | Surface |  |  |  | ◯ |
|  |  |  | Inside |  |  |  | X |
|  |  | 2.0 mm | Surface |  |  |  | ◯ |
|  |  |  | Inside |  |  |  | X |
|  | Curability 405 mm | Film thickness 0.5 mm | Surface | ◯ | ◯ | ◯ | ◯ |
|  |  |  | Inside | ◯ | ◯ | ◯ | ◯ |
|  |  | 1.0 mm | Surface | ◯ | ◯ | ◯ | ◯ |
|  |  |  | Inside | ◯ | ◯ | ◯ | Δ |
|  |  | 1.5 mm | Surface | ◯ | ◯ | ◯ | ◯ |
|  |  |  | Inside | ◯ | Δ | X | X |
|  |  | 2.0 mm | Surface | ◯ | ◯ | ◯ | ◯ |
|  |  |  | Inside | Δ | X | X | X |
|  | Thixotropy | η (mPa · s) | $\eta_1$ Shear rate: 0.1 | 117386 |  |  | 91963 |
|  |  |  | $\eta_2$ Shear rate: 10,000 | 676 |  |  | 59 |
|  |  |  | TI: $\eta_1/\eta_2$ | 173.6 |  |  | 1559 |
|  |  | Recovery time (s) |  | 2 |  |  | 7 |

As described above, the photocurable inkjet ink according to the second embodiment has the following configurations.

(7) The photocurable inkjet ink contains an aminoalkylphenone-based initiator, a phosphine oxide-based initiator, a thioxanthone-based sensitizer, and a radical polymerizable compound.

When the aminoalkylphenone-based initiator, the phosphine oxide-based initiator, and the thioxanthone-based sensitizer are used in combination, the total amount of the initiators dissolved in the ink can be increased. Therefore, the internal curability of the ink can be improved by irradiating the ink with light having a wavelength that easily transmits the ink (for example, light having a wavelength of 405 nm) to generate a sufficient amount of radicals for curing, so that printing onto a medium and shaping of a three-dimensional object, which are performed by ejecting the ink, can be suitably performed.

(8) The photocurable inkjet ink of the second embodiment is preferably used in the 3D dispenser 100 that forms an ink layer by ejecting ink.

By using the photocurable inkjet ink of the second embodiment, the inside of the ink layer formed by the 3D dispenser 100 can be cured favorably. Thus, the amount of the ink ejected from the 3D dispenser 100 can be increased to increase the thickness of each layer of the ink layer to be formed, and the number of times of layering the ink layer can be reduced. This can improve the productivity of the 3D printer 200. Furthermore, since the time required for curing the ink ejected from the 3D dispenser 100 and irradiated with light by using the light irradiation device 211 is short, a highly accurate three-dimensional object can be obtained.

(9) The radical polymerizable compound is preferably an acrylate.

Thus, the polymerizability of the radical polymerizable compound, the durability of the three-dimensional object, and the solubility of the initiator/sensitizer can be improved.

(10) The acrylate is preferably a bifunctional acrylate.

Thus, mechanical properties such as durability and rigidity of the three-dimensional object can be improved.

The method for manufacturing a three-dimensional object according to the second embodiment includes the following steps.

(11) The method for manufacturing a three-dimensional object includes: an ink ejecting step of ejecting the photocurable inkjet ink with the 3D dispenser 100 (dispenser) to form an ink layer; and a curing step of irradiating the ink layer with light having any wavelength ranging from 405 nm to 420 nm to cure the ink layer to form a cured layer.

In the method for manufacturing a three-dimensional object according to the second embodiment, the total amount of initiators dissolved in the ink can be increased by using the photocurable inkjet ink in which the aminoalkylphenone-based initiator, the phosphine oxide-based initiator, and the thioxanthone-based sensitizer are combined. Therefore, the internal curability of the ink can be improved by irradiating the ink with light having any wavelength ranging from 405 nm to 420 nm that easily transmits the ink to generate a sufficient amount of radicals for curing, and shaping of a three-dimensional object can be suitably performed.

(12) A film thickness of the ink layer in the ink ejecting step is preferably 0.1 mm to 2 mm.

By improving the internal curability using the photocurable inkjet ink according to the second embodiment, the thickness of the ink layer to be layered can be increased, the number of times of layering the ink layer can be reduced, and the productivity of the 3D printer 200 can be improved.

(13) In the curing step, it is preferable that light having a wavelength of 365 nm or 385 nm be further emitted. By irradiating the ink with light having a wavelength of 405 nm to 420 nm that easily transmits the ink and then irradiating the ink with light having a wavelength of 365 nm or 385 nm, surface curing can be promoted in addition to the internal curing of the ink layer.

Various embodiments and variations of the present invention are possible without departing from the broader spirit and scope of the present invention. The above-described embodiments are illustrative purpose only and do not intend to limit the scope of the present invention. That is, the scope of the present invention is demarcated by the claims rather than the embodiments. Various variations made within the claims and the scope of the spirit of the present invention which is equivalent to the claims are to be regarded as being within the scope of the present invention.

The invention claimed is:

1. A photocurable inkjet ink comprising: an aminoalkylphenone-based initiator; a phosphine oxide-based initiator; a thioxanthone-based sensitizer; a radical polymerizable compound and a thixotropic agent, wherein a solubility parameter of the radical polymerizable compound is less than 10, and the thixotropic agent is a fine particle having a hydrophilic surface, and the photocurable inkjet ink having a first viscosity of 1,000 mPa·s or less as measured at a shear rate of 10,000 $s^{-1}$, and a second viscosity of 10,000 mPa·s or more as measured at a shear rate set to $10^{-1}$ $s^{-1}$ after a shear force is continuously applied at the shear rate of 10,000 $s^{-1}$ for 30 seconds.

2. The photocurable inkjet ink as set forth in claim 1, which is used in a 3D dispenser that forms an ink layer by ejecting ink.

3. A method for manufacturing a three-dimensional object, comprising:
   an ink ejecting step of forming an ink layer by ejecting the photocurable inkjet ink as set forth in claim 1 with a dispenser; and
   a curing step of irradiating the ink layer with light having any wavelength ranging from 405 nm to 420 nm, and a further curing step of irradiating the ink layer with light having a wavelength of 365 nm or 385 nm, to cure the ink layer to form a cured layer.

4. The method for manufacturing a three-dimensional object as set forth in claim 3, wherein a film thickness of the ink layer in the ink ejecting step is 0.1 mm to 2 mm.

5. The photocurable inkjet ink as set forth in claim 1, wherein the radical polymerizable compound is an acrylate.

6. The photocurable inkjet ink as set forth in claim 5, wherein the acrylate is a bifunctional acrylate.

7. The photocurable inkjet ink as set forth in claim 2, wherein the radical polymerizable compound is a bifunctional acrylate.

8. The photocurable inkjet ink as set forth in claim 1, wherein the thixotropic agent includes silicon dioxide.

9. The photocurable inkjet ink as set forth in claim 8, wherein the fine particle having the hydrophilic surface is a fine particle of silicon dioxide having an untreated surface.

* * * * *